Patented Apr. 13, 1954

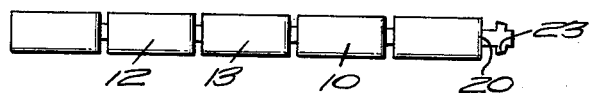
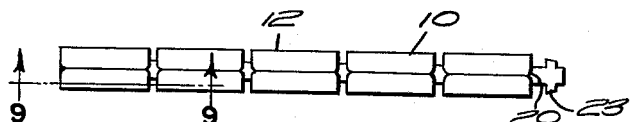
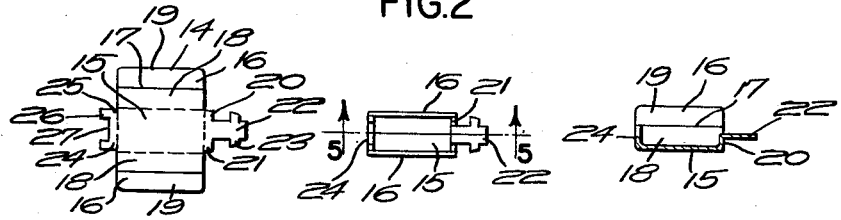
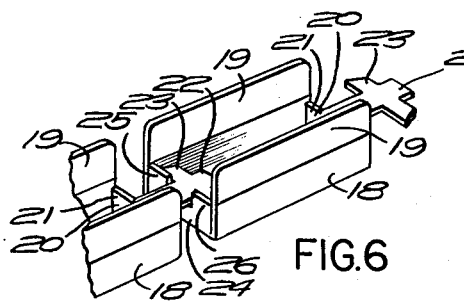
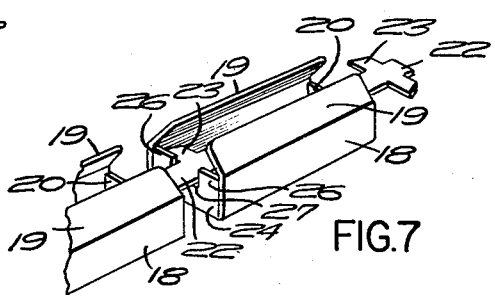
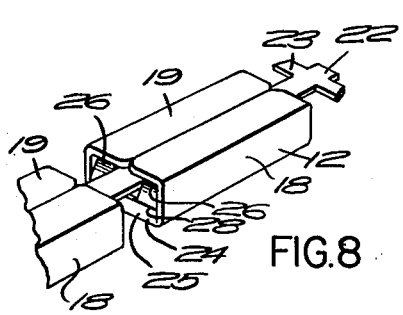
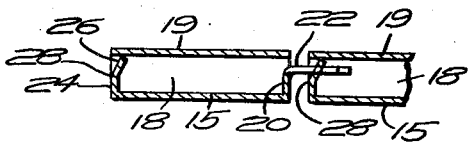

2,674,842

UNITED STATES PATENT OFFICE 2,674,842

ORNAMENTAL SHEET METAL CHAIN

William F. Hess, Providence, R. I.

Application November 3, 1950, Serial No. 193,924

1 Claim. (Cl. 59—80)

The present invention relates to the manufacture of ornamental chains, and has particular reference to a novel construction for facilitating automatic machine manufacture and assembly.

The principal object of the invention is to provide a novel assembly procedure for an ornamental chain.

Another object of the invention is to provide an ornamental flexible chain made of links having integral connecting elements.

A further object is to provide an ornamental flexible chain made of self-centering links.

An additional object of the invention is to provide an ornamental flexible chain of great strength and resistance to link separation.

With the above and other objects and advantageous features in view, the invention consists of a novel assembly procedure and a novel chain link construction more fully disclosed in the detailed description following, in conjunction with the accompanying drawings, and more specifically defined in the claims appended thereto.

In the drawings,

Fig. 1 is a top plan view of an assembled chain;

Fig. 2 is a bottom plan view thereof;

Fig. 3 is a plan view of a link blank;

Fig. 4 is a top plan view of a link blank bent into box form for assembly;

Fig. 5 is a section on the line 5—5 of Fig. 4;

Fig. 6 is a perspective view showing the assembly connections for two links;

Fig. 7 is a perspective view of the links of Fig. 6, the top wings being partially folded;

Fig. 8 is a similar view, the top wings being folded and the end lock tabs being pressed inwardly; and Fig. 9 is an enlarged section on the line 9—9 of Fig. 2.

It has been found desirable to form an ornamental chain of box type links which are flexibly linked together, the links being stamped and folded and having integral connecting tongues, and retaining lock tabs therefor, and the connecting parts being shaped to align the links while providing substantial flexibility. To this end, I form a link blank which can be struck up and bent to provide a box link, with an integral tongue at one end and integral centering lock tabs at the other end, whereby the links may be machine manufactured and assembled.

Referring to the drawings, the ornamental chain 10 is made up of a number of flexibly joined links 12, the links being preferably of the hollow box type with ornamental tops 13 which may be polished or decorated as desired.

Each link is formed from a blank 14, see Fig. 3, which has a top wall portion 15, side portions 16 which are grooved for bending as indicated at 17 to provide sides 18 and wings 19, a forward end 20 which has a lower portion 21 and an integral tongue extension 22 with lateral parts 23, and a rear end 24 which has a lower portion 25 and two spaced tabs 26, which form a tongue receiving recess 27 with the associated lower portion 25. The lower portions 21 and 25 are of the same height.

The blank being struck out, the sides 16, the rear end 24, and the lower forward end portion 21 are bent up, as illustrated in Figs. 4 and 5, and the tongue 22 of one link is received in the recess 27 on the lower rear end portion 25 and between the tabs 26 of the preceding link with the lateral tongue parts 23 behind the spaced tabs 26, as illustrated in Fig. 6. The wings 19 are now partially folded, see Fig. 7, to hold the links together, and are then completely downwardly folded to form a bottom wall and the tabs 26 are bent inwardly as indicated at 28, see Fig. 8, to lock the lateral tongue parts 23 and complete the assembly.

The chain is thus formed of assembled links, the lateral tongue of each link being locked in place by the bent-in tabs of the preceding link, as shown in Fig. 9. The bend 28 is preferably central, whereby the tongues may move in their recesses, but are urged towards the center by the bent-in tabs, thus aligning the links and keeping the lateral tongue parts against the tabs adjacent the bend intermediate the base and the folded wings, where there is great resistance to pulling the links apart. The tongue is thus permitted a limited movement in the recess, to provide flexibility.

Although I have described a specific constructional embodiment of the invention, it is obvious that changes in the size, shape and arrangement of the parts may be made to provide different kinds of ornamental links, without departing from the spirit and the scope of the invention as defined in the appended claim.

I claim:

An ornamental chain having a series of connected links, each link having a top wall, sides, and wings extending from the sides towards each other to provide a bottom wall, the forward end of each link having a vertical portion extending upwardly from the top wall with its upper edge in spaced relation to the bottom wall, said vertical portion having a tongue extension with lateral parts, and the rear of each link having a vertical portion extending upwardly from the top wall with its upper edge in spaced relation to the bottom wall, said rear end vertical portion having spaced tabs inclined inwardly into the link and said forward and rear end vertical portions being of similar height, the tongue extension at the forward end of each link being seated on the vertical portion at the rear end of the continguous link with the tongue extension lateral parts behind the inclined inwardly spaced tabs thereof.

References Cited in the file of this patent

UNITED STATES PATENTS

| Number | Name | Date |
|---|---|---|
| 1,200,463 | Brettner | Oct. 10, 1916 |
| 1,224,585 | Ware | May 1, 1917 |
| 1,304,706 | Pruefer | May 27, 1919 |
| 1,344,365 | Wachenheimer | June 22, 1920 |
| 2,537,789 | Saccoccio | Jan. 9, 1951 |